US010347882B2

(12) United States Patent
Takahashi et al.

(10) Patent No.: US 10,347,882 B2
(45) Date of Patent: Jul. 9, 2019

(54) ELECTRONIC APPARATUS

(71) Applicant: KYOCERA CORPORATION, Kyoto (JP)

(72) Inventors: Daisuke Takahashi, Omihachiman (JP); Taisuke Imazu, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 287 days.

(21) Appl. No.: 15/276,624

(22) Filed: Sep. 26, 2016

(65) Prior Publication Data

US 2017/0012254 A1   Jan. 12, 2017

Related U.S. Application Data

(63) Continuation of application No. PCT/JP2015/084635, filed on Dec. 10, 2015.

(30) Foreign Application Priority Data

Dec. 25, 2014   (JP) .................................. 2014-262218

(51) Int. Cl.
*H01M 2/10*   (2006.01)
*G06F 1/16*   (2006.01)

(52) U.S. Cl.
CPC ............ *H01M 2/1022* (2013.01); *G06F 1/16* (2013.01); *H01M 2/1066* (2013.01); *H01M 2220/30* (2013.01)

(58) Field of Classification Search
None
See application file for complete search history.

(56) References Cited

U.S. PATENT DOCUMENTS

2006/0109610 A1* 5/2006 Liu .................... H01M 2/1066
                                                           361/600
2015/0326967 A1   11/2015 Otani

FOREIGN PATENT DOCUMENTS

| JP | 52-053322 | 4/1977 |
| JP | 63-085866 | 6/1988 |
| JP | 05-048693 | 2/1993 |
| JP | 2014-002935 | 1/2014 |
| WO | WO 2013/094391 A1 | 6/2013 |

OTHER PUBLICATIONS

International Search Report in International Application No. PCT/JP2015/084635, dated Feb. 23, 2016, in 2 pages.
Written Opinion of the International Searching Authority in International Application No. PCT/JP2015/084635, dated Feb. 23, 2016, and Statement of Relevance of non-English References, in 6 pages.

* cited by examiner

*Primary Examiner* — Wojciech Haske
(74) *Attorney, Agent, or Firm* — Duane Morris LLP

(57) ABSTRACT

An electronic apparatus from which a battery is detachable is disclosed. A battery includes a first surface including a first end portion and a second end portion in a direction parallel to the first surface, and a second surface opposite to the first surface. A battery accommodating part is configured to accommodate the battery with the first surface of the battery exposed from the battery accommodating part. A cover is configured to cover the battery in the battery accommodating part. A first restraint part is configured to restrain the first end portion from moving toward the cover and is covered with the cover. A second restraint part is configured to restrain the second end portion from moving toward the cover and is covered with the cover.

8 Claims, 10 Drawing Sheets

ELECTRONIC APPARATUS

CROSS-REFERENCE TO RELATED APPLICATION

The present application is a continuation based on PCT Application No. PCT/JP2015/084635 filed on Dec. 10, 2015, which claims the benefit of Japanese Application No. 2014-262218, filed on Dec. 25, 2014. PCT Application No. PCT/JP2015/084635 is entitled "ELECTRONIC DEVICE" and Japanese Application No. 2014-262218 is entitled "ELECTRONIC APPARATUS". The contents of which are incorporated by reference herein in their entirety.

FIELD

Embodiments of the present disclosure relate to electronic apparatuses.

BACKGROUND

Various techniques have been proposed for electronic apparatuses.

SUMMARY

An electronic apparatus is disclosed. In one embodiment, an electronic apparatus from which a battery is detachable comprises a battery, a battery accommodating part, a cover, a first restraint part, and a second restraint part. The battery includes a first surface including a first end portion and a second end portion in a direction parallel to the first surface, and a second surface opposite to the first surface. The battery accommodating part is configured to accommodate the battery with the first surface of the battery exposed from the battery accommodating part. The cover is configured to cover the battery in the battery accommodating part. The first restraint part is configured to restrain the first end portion from moving toward the cover and is covered with the cover. The second restraint part is configured to restrain the second end portion from moving toward the cover and is covered with the cover.

DETAILED DESCRIPTION

External Appearance of Electronic Apparatus

Figure 1:
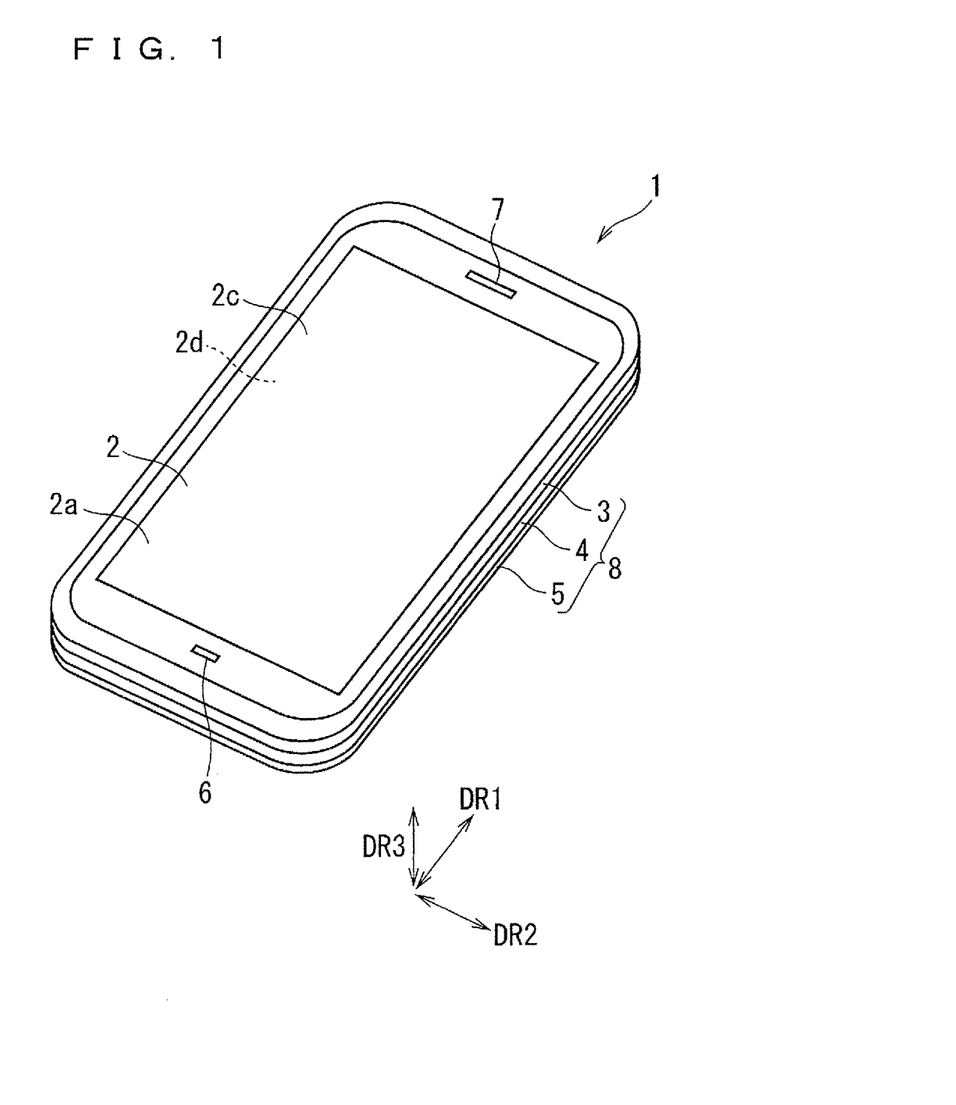
FIG. 1 illustrates a perspective view of an external appearance of an electronic apparatus.
Figure 2:
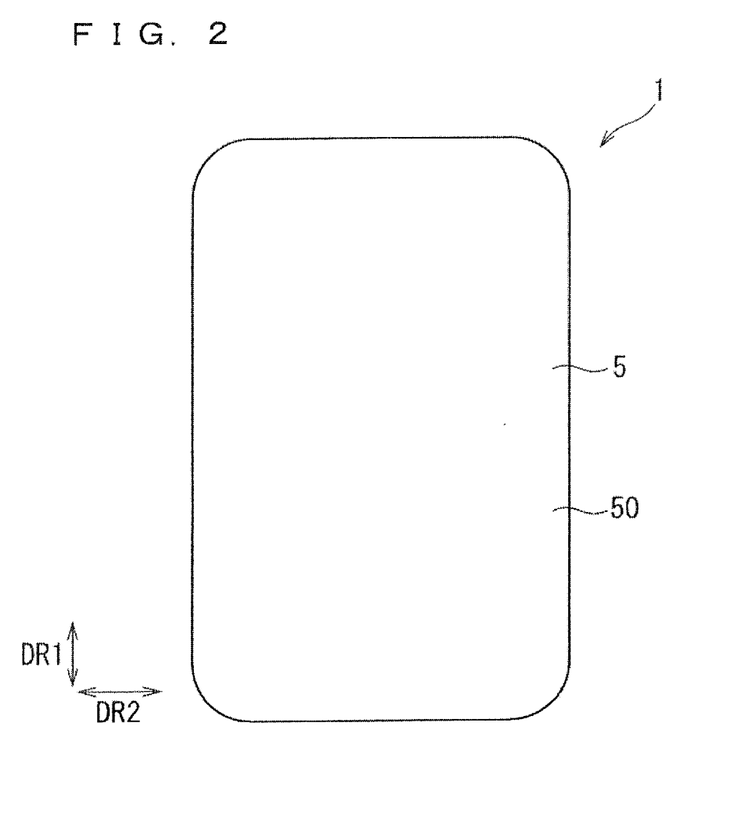
FIG. 2 illustrates a rear view of an external appearance of the electronic apparatus.

FIG. 1 and FIG. 2 respectively illustrate a perspective view and a rear view of an external appearance of an electronic apparatus 1. The electronic apparatus 1 is portable phones such as a smartphone.

As illustrated in FIGS. 1 and 2, the electronic apparatus 1 includes a cover panel 2 disposed on a front surface of the electronic apparatus 1, a front-side case 3 to which the cover panel 2 is affixed, a rear-side case 4 which is attached to the front-side case 3, and a rear cover 5 which is attached to the rear-side case 4 and is disposed on a rear surface of the electronic apparatus 1.

The rear-side case 4 is attached to the front-side case 3 from a side opposite to the cover panel 2. The rear cover 5 is attached to the rear-side case 4 so as to cover a rear surface of the rear-side case 4.

The front-side case 3, the rear-side case 4, and the rear cover 5 form an exterior case 8 of the electronic apparatus 1. The electronic apparatus 1 has a substantially rectangular plate shape in a plan view.

The cover panel 2 forms a portion, except a circumferential edge portion, of a front surface of the electronic apparatus 1. The front-side case 3 forms the peripheral edge portion of the front surface of the electronic apparatus 1 and a side surface portion of the electronic apparatus 1. The rear-side case 4 and the rear cover 5 form the side surface portion of the electronic apparatus 1. The rear cover 5 forms a rear surface portion of the electronic apparatus 1.

The front-side case 3, the rear-side case 4, and the rear cover 5 are formed of, for example, resin or a combination of resin with metal. Examples of the resin may include polycarbonate resin, acrylonitrile butadiene styrene (ABS) resin, nylon-based resin, and the like. Examples of the metal may include aluminum and the like.

Figure 3:
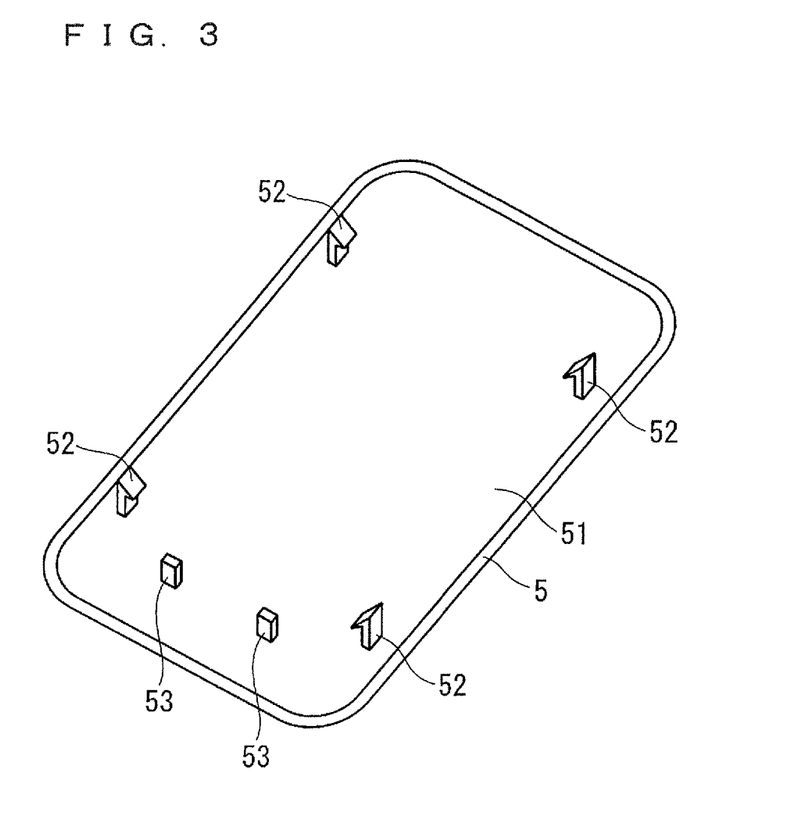
FIG. 3 illustrates a perspective view of a rear cover as seen from an inner main surface of the rear cover.
Figure 4:
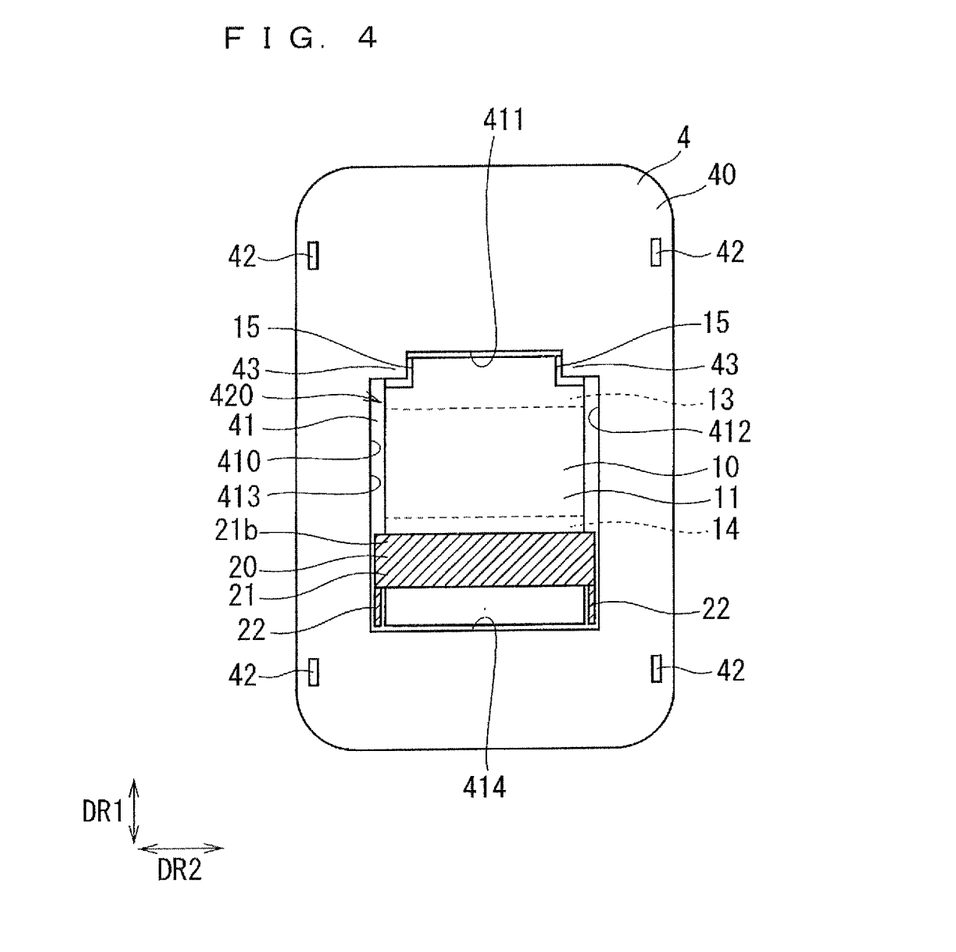
FIG. 4 illustrates a rear view of an external appearance of the electronic apparatus from which a rear cover is removed.

The front-side case 3 and the rear-side case 4 are bonded together with an adhesive or a double-sided tape. The rear cover 5 is attached to the rear-side case 4 in a detachable manner by fitting hooks 52 provided in an inner surface of the rear cover 5, as will be described later (FIGS. 3, 4).

The cover panel 2 has a substantially rectangular plate shape in a plan view. The cover panel 2 comprises a first main surface 2c that forms a front surface of the electronic apparatus 1, and a second main surface 2d opposite to the first main surface 2c.

As illustrated in FIG. 1, the cover panel 2 has a substantially rectangular shape which is made longer in a first direction DR1 parallel to the first main surface 2c. Accordingly, assuming that a direction parallel to the first main surface 2c and perpendicular to the first direction DR1 is defined as a second direction DR2, a length of the cover panel 2 that extends in the first direction DR1 is larger than a length of the cover panel 2 that extends in the second direction DR2. In addition, it is assumed that a direction perpendicular to the first main surface 2c is defined as a third direction DR3. Hereinafter, the first direction DR1, the second direction DR2, and the third direction DR3 will be sometimes referred to as a "lengthwise direction DR1", a "widthwise direction DR2", and a "thickness direction DR3", respectively.

The cover panel 2 is formed of, for example, acrylic resin, glass, or sapphire. In this regard, sapphire refers to a single crystal mainly composed of alumina ($Al_2O_3$). In this description, sapphire refers to a single crystal in which a purity of $Al_2O_3$ is not lower than approximately 90%. It is preferable that the purity of $Al_2O_3$ be not lower than 99% from the viewpoints of increasing resistance to damages and reducing chipping or cracking with higher reliability.

If the cover panel 2 is formed of sapphire, the cover panel 2 may be either a panel with a single-layer structure including a sapphire layer or a composite panel with a multilayer structure including a sapphire layer (hereinafter, such a composite panel will be sometimes referred to as a "laminated panel").

For example, the cover panel 2 may be a laminated panel with a two-layer structure including a sapphire layer formed on a surface of the electronic apparatus 1 (hereinafter, such a sapphire layer will be sometimes referred to as a "sapphire panel"), and a glass layer affixed to the sapphire panel (hereinafter, such a glass layer will be sometimes referred to as a "glass panel"). The cover panel 2 may also be a laminated panel with a three-layer structure including a first sapphire panel formed on a surface of the electronic apparatus 1, a glass panel affixed to the first sapphire panel, and a second sapphire panel affixed to the glass panel. Further, the cover panel 2 may include a layer formed of a crystalline material other than sapphire, such as diamond, zirconia, titania, crystal, lithium tantalite, or aluminum oxynitride. With regard to these materials, a single crystal with a purity of not lower than approximately 90% is preferable from the viewpoints of increasing resistance to damages and reducing chipping or cracking with higher reliability.

The peripheral edge of the cover panel 2 is affixed to the front-side case 3 with a double-sided tape or an adhesive, with the first main surface 2c directed outward.

A touch panel is affixed to the second main surface 2d opposite to the first main surface 2c in the cover panel 2. A display is then affixed to a main surface of the touch panel, which is disposed opposite to the second main surface 2d of the cover panel 2. The display and the touch panel are disposed in a space surrounded by the cover panel 2 and the front-side case 3.

The display is, for example, a liquid crystal display and an organic electroluminescent (EL) display. The cover panel 2 comprises a transparent display area 2a through which matters to be displayed on the display pass (such a display area will be sometimes referred to as a "display window"). A user of the electronic apparatus 1 is able to visually recognize information displayed on the display through the display area 2a, from the outside of the electronic apparatus 1.

The touch panel is, for example, a projection-type capacitive touch panel. When the user of the electronic apparatus 1 performs an operation on the display area 2a of the cover panel 2 with the use of an operator such as his/her fingers, the performed operation is detected by the touch panel. The user is thus able to give various instructions to the electronic apparatus 1.

As illustrated in FIG. 1, a microphone hole 6 is bored in a lower end portion of the cover panel 2. Further, a receiver hole 7 is bored in an upper end portion of the cover panel 2. A microphone and a receiver (not illustrated) are provided inside the front-side case 3.

The microphone can convert a sound received from the outside of the electronic apparatus 1, into an electrical sound signal. The sound from the outside of the electronic apparatus 1 is captured into the electronic apparatus 1 through the microphone hole 6 formed in the front surface of the cover panel 2, and then is input to the microphone.

The receiver is, for example, a dynamic speaker. The receiver can convert an electrical sound signal received by the electronic apparatus 1, into a sound, and then output the sound, for example. The sound from the receiver is output to the outside through the receiver hole 7 formed in the front surface of the cover panel 2. The receiver can output, for example, a ringing tone. The receiver may comprise a receiver including a piezoelectric vibrating element.

FIG. 3 illustrates a perspective view of the rear cover 5 of the electronic apparatus 1, as seen from the inner surface side of the rear cover 5. As illustrated in FIGS. 2 and 3, the rear cover 5 includes an inner main surface 51 and an outer main surface 50 opposite to the inner main surface 51. The rear cover 5 has a shape which is made longer in one direction. The rear cover 5 includes the plurality of fitting hooks 52 on a periphery edge portion of the inner main surface 51. The rear cover 5 also includes two restraint parts 53 on a lower end portion of the inner main surface 51. Each of the restraint parts 53 is, for example, a rod-like protrusion. Functions of the restraint parts 53 will be later described later in detail.

FIG. 4 illustrates a rear view of the electronic apparatus 1 in which the rear cover 5 is detached from the rear-side case 4. As illustrated in FIG. 4, when the rear cover 5 is detached from the rear-side case 4, a rear surface 40 of the rear-side case 4 is exposed. A plurality of fitting holes 42 is formed in a peripheral edge portion of the rear surface 40 of the rear-side case 4. The fitting hooks 52 of the rear cover 5 are fitted into the fitting holes 42, so that the rear cover 5 is attached to the rear-side case 4. The rear cover 5 is thus easily detachable from the rear-side case 4.

The rear surface 40 of the rear-side case 4 is provided with an accommodating part 41 recessed toward the cover panel 2. The accommodating part 41 can accommodate a battery 10. The battery 10 is detachable from the electronic apparatus 1.

The battery 10 can output electric power for the electronic apparatus 1. The electric power from the battery 10 is fed to various electronic components, such as the display, touch panel, microphone, and receiver, of the electronic apparatus 1. The battery 10 is, for example, a lithium-ion secondary battery. The battery 10 accommodated in the accommodating part 41 is covered with the rear cover 5 attached to the rear-side case 4.

As described above, the rear cover 5 covering the battery 10 in the accommodating part 41 prevents the battery 10 from coming off the accommodating part 41. In some instances, however, the battery 10 tends to come off the accommodating part 41 when the electronic apparatus 1 receives an impact generated due to the drop of the electronic apparatus 1. If the weight of the battery 10 is increased for increasing the capacity of the battery 10, the battery 10 is more likely to come off the accommodating part 41 when the impact is applied to the electronic apparatus 1. The battery 10 pushes the rear cover 5 in an attempt to come off the accommodating part 41, so that the rear cover 5 might come off the electronic apparatus 1.

In view of the above circumstances, the electronic apparatus 1 comprises a structure preventing the battery 10 from easily coming off the accommodating part 41. The details of this structure will be described below. Hereinafter, a term "a left side" means the left side of the electronic apparatus 1 seen from the rear surface of the electronic apparatus 1, and a term "a right side" means the right side of the electronic apparatus 1 seen from the rear surface of the electronic apparatus 1.

Figure 5:
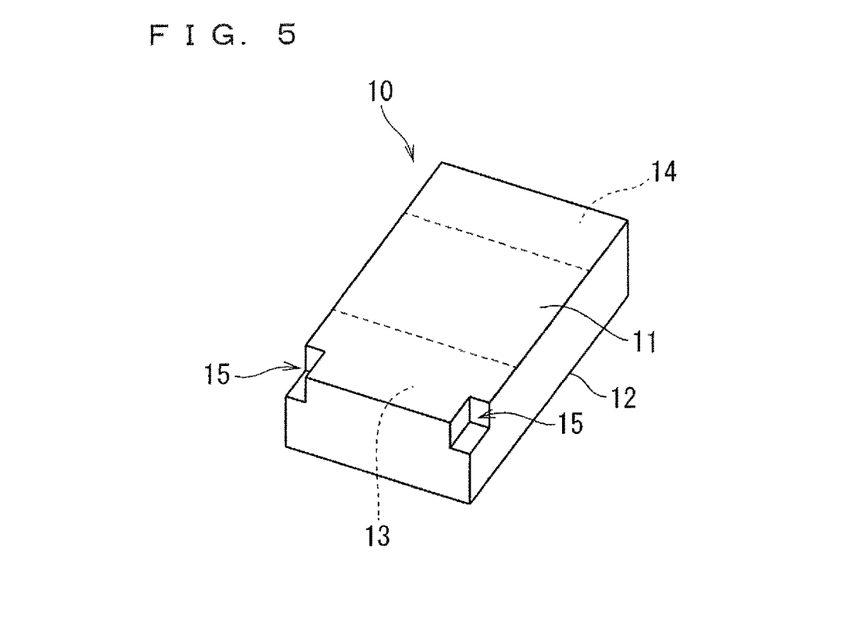
FIG. 5 illustrates a perspective view of an external appearance of a battery.

FIG. 5 illustrates a perspective view of an external appearance of the battery 10. The battery 10 has a substantially rectangular plate shape which is made longer in one direction in a plan view. The battery 10 comprises a first main surface 11 and a second main surface 12 opposite to the first main surface 11. The battery 10 is accommodated in the accommodating part 41 with the first main surface 11 exposed from the accommodating part 41. In other words, the battery 10 is accommodated in the accommodating part 41 with the second main surface 12 directed downward.

As illustrated in FIGS. 4 and 5, the first main surface 11 comprises an upper end portion 13 which is disposed on an upper side in the lengthwise direction DR1 when the battery 10 is accommodated in the accommodating part 41, and a lower end portion 14 which is opposite to the upper end portion 13. Each of both corners of the upper end portion 13 of the battery 10 is provided with a cutout 15 recessed in a thickness direction of the battery 10.

The accommodating part 41 comprises an inner wall 410 provided with two fitting parts 43 fitted into the respective two cutouts 15 in the first main surface 11 of the battery 10 when the battery 10 is accommodated in the accommodating part 41. The inner wall 410 of the accommodating part 41 includes an upper inner wall 411, a lower inner wall 414, a right inner wall 412, and a left inner wall 413. Each of the fitting parts 43 protrudes from the upper inner wall 411 of the accommodating part 41 toward the inside of the accommodating part 41. The two fitting parts 43 are disposed on both ends of the upper inner wall 411 in the widthwise direction DR2 so as to cover both upper corner portions of an opening 420 of the accommodating part 41, which are formed in the rear surface 40 of the rear-side case 4. The two fitting parts 43 protrude from both the upper corners of the opening 420 toward the inside of the opening 420. The battery 10 is accommodated in the accommodating part 41 with the two fitting parts 43 disposed on the battery 10, and the two fitting parts 43 are fitted into the respective two cutouts 15 of the battery 10.

As described above, the upper end portion 13 of the first main surface 11 of the battery 10 accommodated in the accommodating part 41 faces, in the thickness direction DR3, the two fitting parts 43 protruding from the inner wall 410 of the accommodating part 41. Therefore, the two fitting parts 43 function as restraint parts that can restrain the upper end portion 13 of the battery 10 from moving toward the rear cover 5 (i.e., outward). This prevents the battery 10 from coming off the accommodating part 41.

Further, the fitting parts 43 facing the first main surface 11 of the battery 10 are fitted into the cutouts 15 in the first main surface 11, which makes it possible to reduce the thickness of the electronic apparatus 1. Moreover, it is possible to prevent the battery 10 from being accommodated in the accommodating part 41 in an erroneous orientation.

The cutouts 15 in the battery and the fitting parts 43 restrain the movement of the battery in the above description; however, a way of restraining the movement of a battery is not limited thereto. Also, the positions of the cutouts 15 and fitting parts 43 are not limited to those described above. Further, the battery 10 should not necessarily be provided with the cutouts 15.

As illustrated in FIG. 4, a restraint member 20 functioning as a restraint part which can restrain the lower end portion 14 of the first main surface 11 of the battery 10 from moving toward the rear cover 5 (i.e., outward) is provided in a lower area of the accommodating part 41. In FIG. 4, the restraint member 20 is denoted as a diagonally shaded area. The restraint member 20 can be configured to cover a part of the lower end portion 14 of the first main surface 11 of the battery 10, and can be attached to the inner wall 410 of the accommodating part 41.

As described above, with not only the fitting parts 43 that restrains the upper end portion 13 of the first main surface 11 of the battery 10 from moving toward the rear cover 5 but also the restraint member 20 that restrains the lower end portion 14 of the first main surface 11 from moving toward of the rear cover 5 provided, the battery 10 is further prevented from coming off the accommodating part 41.

Details of Restraint Member

Figure 6:
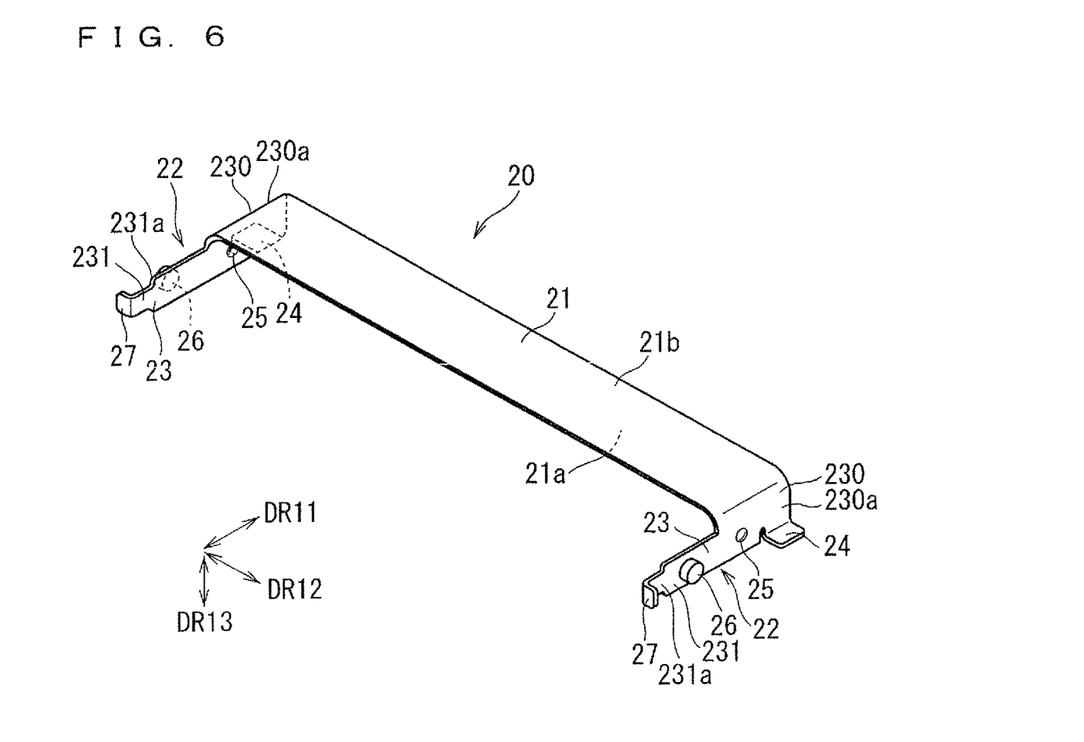
FIG. 6 illustrates a perspective view of an external appearance of a restraint member.
Figure 7:
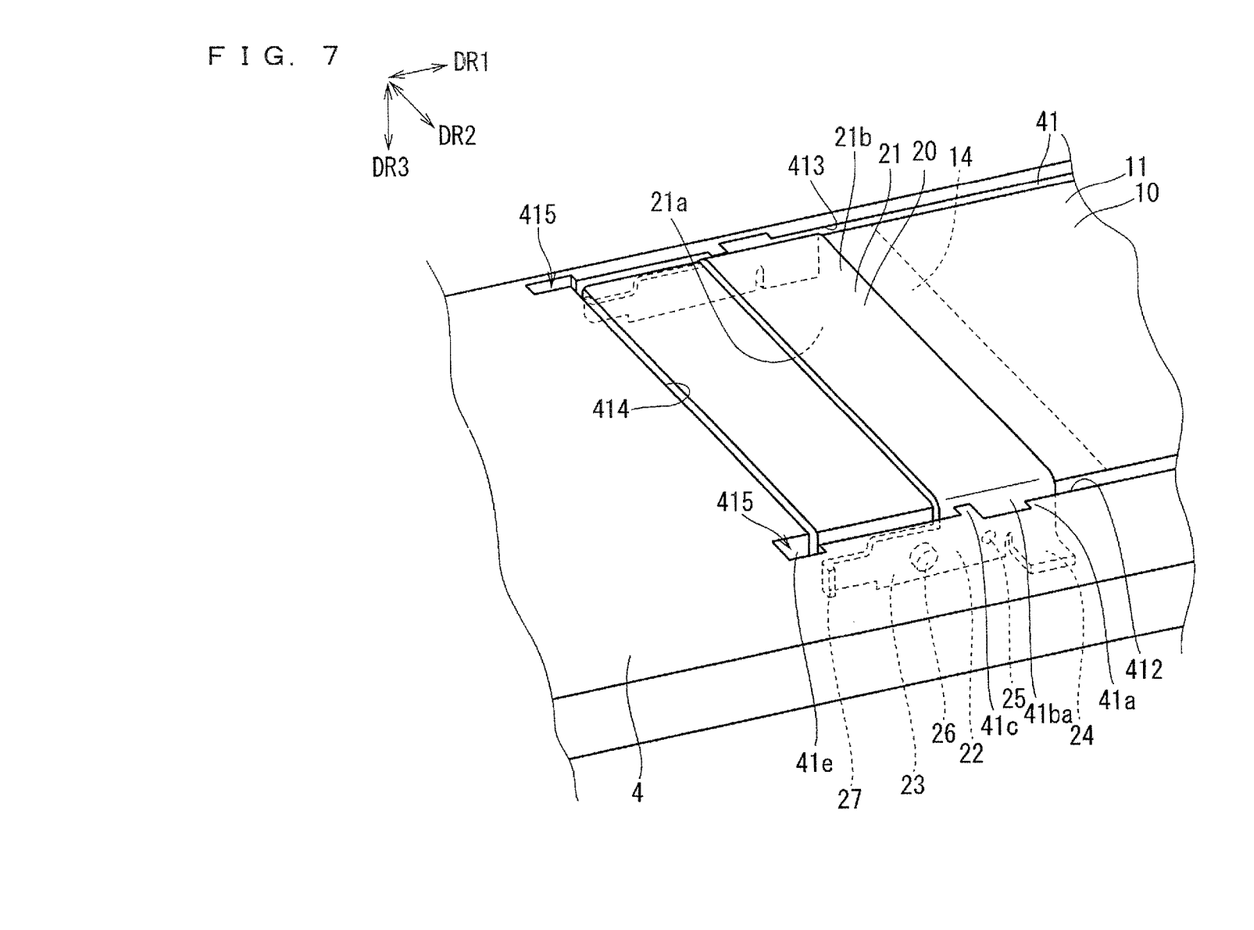
FIG. 7 illustrates an enlarged perspective view of an accommodating part.

FIG. 6 illustrates a perspective view of an external appearance of the restraint member 20. FIG. 7 illustrates an enlarged perspective view of the accommodating part 41. As illustrated in FIGS. 6 and 7, the restraint member 20 includes a facing part 21 that faces the lower end portion 14 of the first main surface 11 of the battery 10, and a pair of attachment parts 22 for attaching the restraint member 20 to the accommodating part 41. The facing part 21 and the pair of attachment parts 22 are formed integrally with each other.

The facing part 21 has a plate shape which is made longer in one direction. The facing part 21 comprises a facing surface 21a that faces the battery 10, and a non-facing surface 21b opposite to the facing surface 21a. Hereinafter, directions in a widthwise direction, a lengthwise direction, and a thickness direction of the facing part 21 will be respectively referred to as a "first direction DR11", a "second direction DR12", and a "third direction DR13".

Each of the pair of the attachment parts 22 has a long elongated shape as a whole, and includes a plate-like portion 23 which is made longer in one direction, and protrusions 24, 25, 26, and 27 each protruding from the plate-like portion 23. The attachment parts 22 extend from both lengthwise ends of the facing part 21 toward the same side in the first direction DR11. The plate-like portions 23 of the attachment parts 22 are almost perpendicular to the plate-like facing part 21.

The plate-like portion 23 includes a first portion 230 connected to one lengthwise end of the facing part 21, and a second portion 231 extending from the first portion 230 in the first direction DR11. The protrusion 24 and the protrusion 25 protrude outward from an outer surface 230a of the first portion 230. The protrusion 26 and the protrusion 27 protrude outward from an outer surface 231a of the second portion 231. The protrusion 24, the protrusion 25, the protrusion 26, and the protrusion 27 are arranged in this order, from one of lengthwise ends of the plate-like portion 23, which is closer to the facing part 21, to the other lengthwise end opposite to the one lengthwise end.

The protrusion 24 has a plate shape. The protrusion 24 protrudes outward (i.e., in the second direction DR12) from an end opposite to an end closer to the facing part 21, out of both ends of the outer surface 230a of the first portion 230 in the third direction DR13. The plate-like protrusion 24 protrudes from the first portion 230 so as to be parallel to the plate-like facing part 21. The protrusion 25 has a hemispherical shape.

The protrusion 26 has a cylindrical shape. The protrusion 26 protrudes outward from a center portion of the outer surface 231a of the second portion 231 in the first direction DR11. The protrusion 27 has a plate shape. The protrusion 27 protrudes outward from an end opposite to an end closer to the first portion 230, out of both ends of the outer surface 231a of the second portion 231 in the first direction DR11.

The plate-like protrusion 27 protrudes from the second portion 231 so as to be perpendicular to the plate-like facing part 21.

The restraint member 20 having the above structure is attached to the accommodating part 41 accommodating the battery 10 such that the facing part 21 faces the lower end portion 14 of the first main surface 11 of the battery 10 and the attachment parts 22 face both side surfaces of the battery 10 which are opposite in the widthwise direction DR2. In the restraint member 20, the attachment parts 22 are attached to the right inner wall 412 and left inner wall 413 of the accommodating part 41. The restraint member 20 is disposed in the accommodating part 41 so as to be slidable between a restraint position and a non-restraint position in the lengthwise direction DR1. Herein, the restraint position means a position where the restraint member 20 restrains the lower end portion 14 of the first main surface 11 of the battery 10 from moving outward. On the other hand, the non-restraint position means a position where the restraint member 20 does not restrain the lower end portion 14 of the first main surface 11 of the battery 10 from moving outward.

Figure 8:
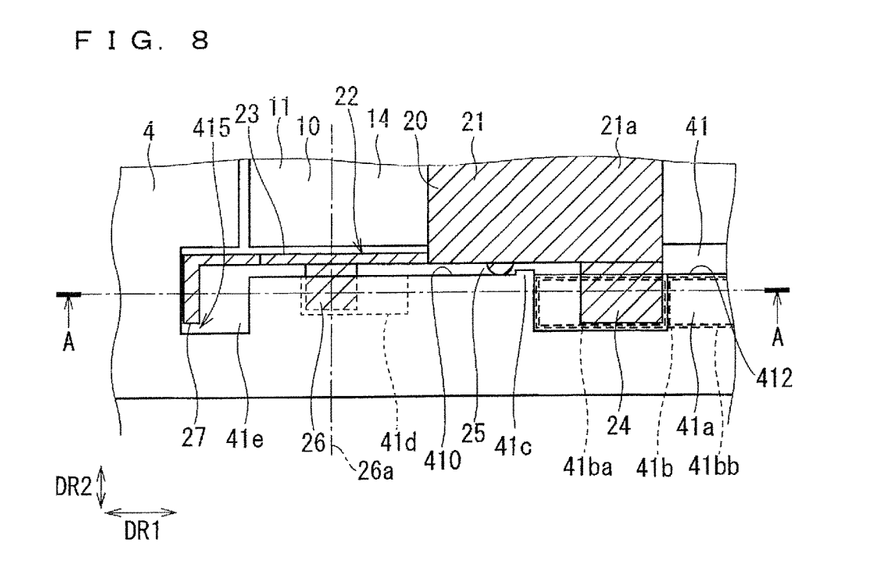
FIG. 8 illustrates an enlarged top view of a restraint member in a non-restraint position.
Figure 9:
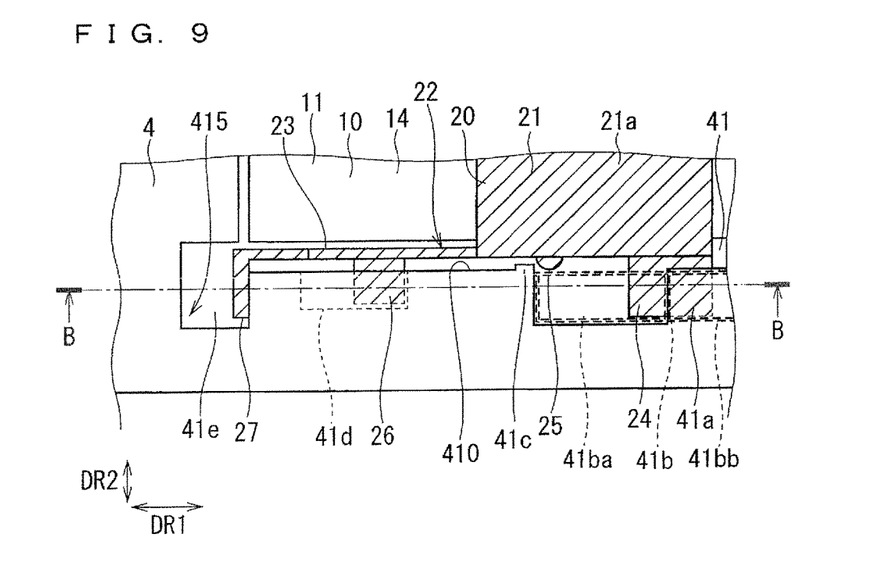
FIG. 9 illustrates an enlarged top view of a restraint member in a restraint position.
Figure 10:
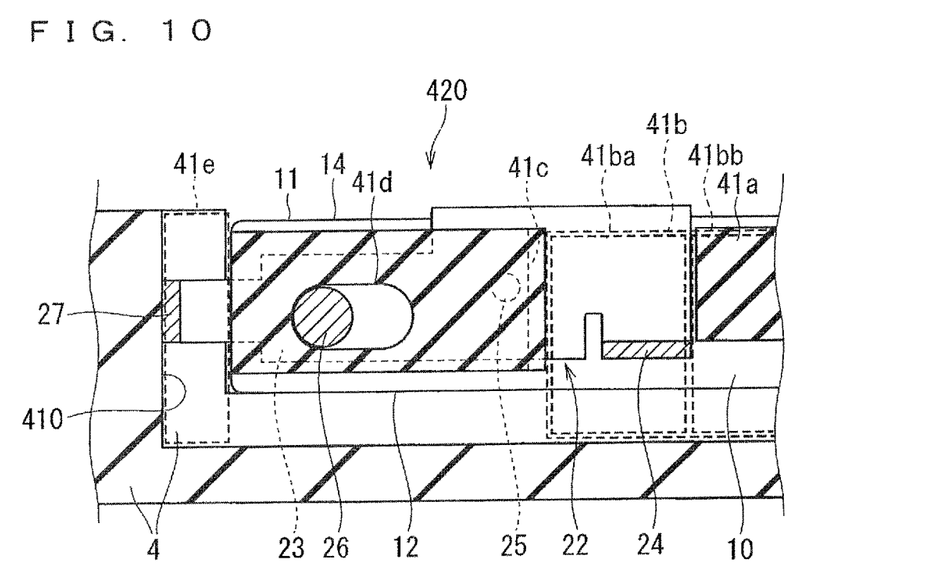
FIG. 10 illustrates an enlarged sectional view of a restraint member in a non-restraint position.
Figure 11:
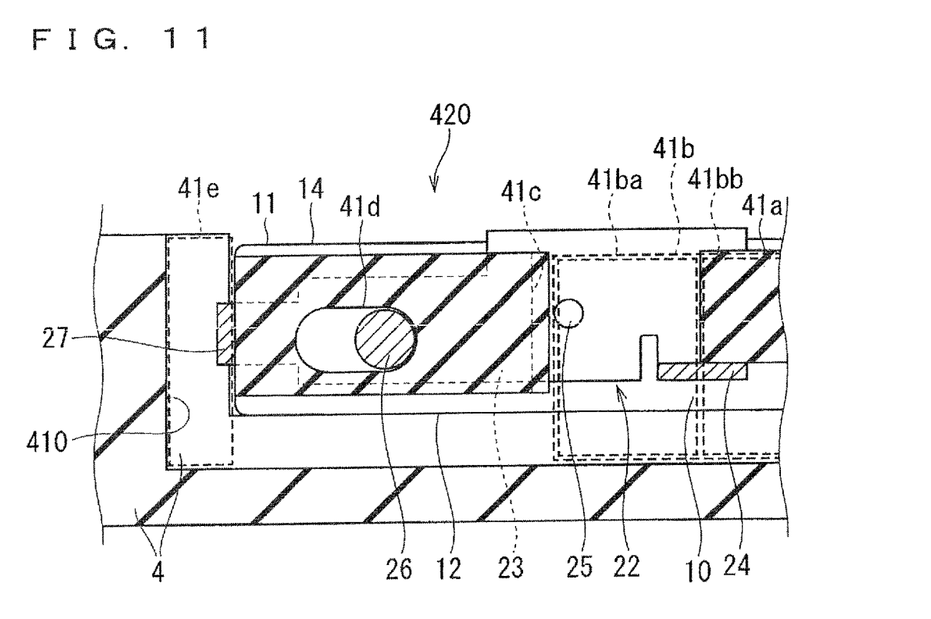
FIG. 11 illustrates an enlarged sectional view of a restraint member in a restraint position.

FIG. 7 illustrates the restraint member 20 in the restraint position. FIG. 8 and FIG. 9 respectively illustrate an enlarged top view of the restraint member 20 in the non-restraint position and an enlarged top view of the restraint member 20 in the restraint position. In FIGS. 8 and 9, the restraint member 20 is denoted as a diagonally shaded area. FIGS. 8 and 9 illustrate structures around one of the attachment parts 22 of the restraint member 20 in the electronic apparatus 1, in an enlarged manner. The restraint member 20 and the accommodating part 41 are structurally symmetrical in the widthwise direction DR2. Accordingly, structures around the other attachment part 22 of the restraint member 20 in the electronic apparatus 1 are similar to that illustrated in FIGS. 8 and 9. FIG. 10 illustrates an enlarged sectional view of the structure of the restraint member 20, the sectional view being taken along line A-A in FIG. 8. FIG. 11 illustrates an enlarged sectional view of the structure of the restraint member 20, the sectional view being taken along line B-B in FIG. 9. FIGS. 8 to 11 illustrate a state in which the rear cover 5 is detached.

Each of the right inner wall 412 and the left inner wall 413 of the accommodating part 41 is provided with a sliding recess 41d recessed in the widthwise direction DR2. The restraint member 20 is disposed in the accommodating part 41 such that the protrusions 26 of the attachment parts 22 are fitted into the respective sliding recesses 41d of the right inner wall 412 and left inner wall 413 of the accommodating part 41. The restraint member 20 is thus attached to the accommodating part 41. Also, each of the sliding recesses 41d extends in the lengthwise direction DR1. Therefore, the protrusions 26 of the restraint member 20 are slidable inside the sliding recesses 41d in the lengthwise direction DR1. This makes the restraint member 20 slidable in the lengthwise direction DR1. The user is able to shift the restraint member 20 between the restraint position and the non-restraint position by causing the restraint member 20 to slide in the lengthwise direction DR1. More specifically, when the restraint member 20 is caused to slide toward an upper end of the accommodating part 41 in the lengthwise direction DR1, the restraint member 20 is in the restraint position. On the other hand, when the restraint member 20 is caused to slide toward a lower end of the accommodating part 41 in the lengthwise direction DR1, the restraint member 20 is in the non-restraint position. Further, in a state in which the rear cover 5 is not attached to the rear-side case 4, the restraint member 20 in the non-restraint position is turnable about the protrusions 26. Meanwhile, the sliding and turning of the restraint member 20 will be described later in detail.

Each of the right inner wall 412 and the left inner wall 413 of the accommodating part 41 is provided with a restraint part 41a, a first recess 41b, and a protrusion 41c, in addition to the sliding recess 41d. Also, a second recess 41e is formed at each of both lower corners 415 of the inner wall 410 of the accommodating part 41.

The first recess 41b extends in the lengthwise direction DR1. The restraint part 41a can restrain the restraint member 20 from turning in the restraint position. The restraint part 41a protrudes from an end of a bottom surface of the first recess 41b, which is closer to the opening 420 in the thickness direction DR3, toward the inside of the accommodating part 41. The first recess 41b includes a first portion 41ba which is not covered with the restraint part 41a as seen from the opening 420, and a second portion 41bb which is covered with the restraint part 41a as seen from the opening 420. The first portion 41ba is in a position closer to a lower end of the accommodating part 41 than the second portion 41bb.

The protrusion 41c is present in an area from one end to the other end of the inner wall 410 in the thickness direction DR3. The protrusion 41c is disposed so as to be adjacent to the first portion 41ba of the first recess 41b in the lengthwise direction DR1 The protrusion 41c is disposed in a position closer to a lower end of the accommodating part 41 than the first recess 41b. The protrusion 41c is disposed on an inner side with respect to the restraint part 41a in the accommodating part 41.

The sliding recess 41d is disposed between the second recess 41e provided in the lower corner 415 of the inner wall 410 of the accommodating part 41 and the protrusion 41c in the lengthwise direction DR1.

As illustrated in FIGS. 8 to 11, the restraint member 20 is disposed in the accommodating part 41 such that the protrusion 24, the protrusion 26, and the protrusion 27 of one of the attachment parts 22 are respectively disposed inside the first recess 41b, the sliding recess 41d, and the second recess 41e of the right inner wall 412 of the accommodating part 41, and the protrusion 24, the protrusion 26, and the protrusion 27 of the other attachment part 22 are respectively disposed inside the first recess 41b, the sliding recess 41d, and the second recess 41e of the left inner wall 413 of the accommodating part 41. When the restraint member 20 is disposed in the accommodating part 41, the protrusion 25 of one of the attachment parts 22 faces the protrusion 41c of the right inner wall 412 in the lengthwise direction DR1, and the protrusion 25 of the other attachment part 22 faces the protrusion 41c of the left inner wall 413 in the lengthwise direction DR1. The protrusions 24, the protrusions 26, and the protrusions 27 of the attachment parts 22 are respectively movable within the first recesses 41b, the sliding recesses 41d, and the second recesses 41e of the accommodating part 41 in the lengthwise direction DR1. Thus, when the restraint member 20 slides in the lengthwise direction DR1, the protrusions 24, the protrusions 26, and the protrusions 27 of the attachment parts 22 respectively move within the first recesses 41b, the sliding recesses 41d, and the second recesses 41e in the lengthwise direction DR1.

Figure 12:
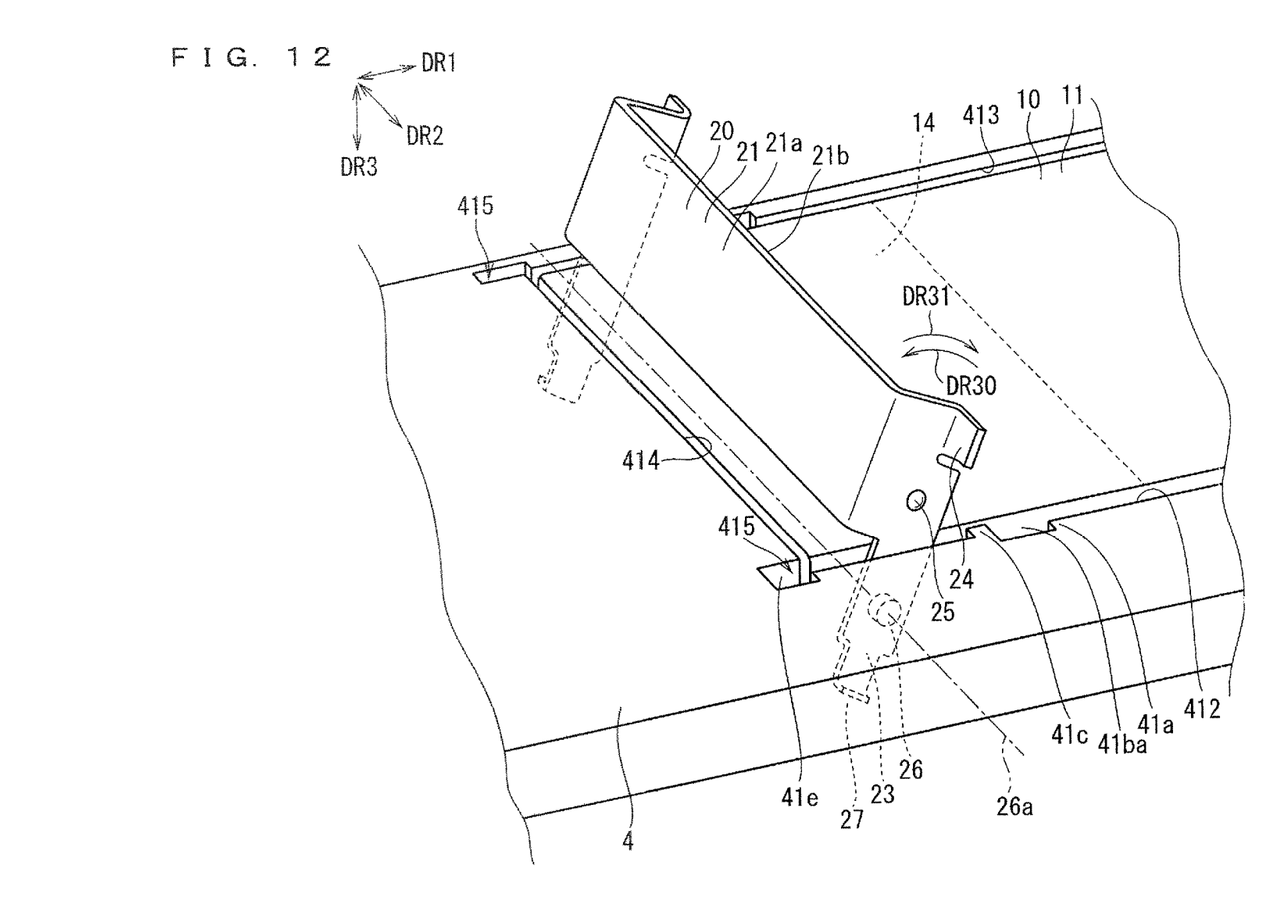
FIG. 12 illustrates how a restraint member turns.

As illustrated in FIGS. 8 and 10, when the restraint member 20, which slides in the lengthwise direction DR1, is disposed in a relatively lower area in the accommodating part 41, the restraint member 20 is in the non-restraint position. When the restraint member 20 is in the non-restraint position, the protrusions 24 of the attachment parts 22 are disposed inside the first portions 41ba of the first recesses 41b of the accommodating part 41, and the protrusions 25 of the attachment parts 22 are disposed in a position closer to a lower end of the accommodating part 41 than the protrusions 41c of the accommodating part 41. When the protrusions 24 are disposed inside the first portions 41ba of the first recesses 41b, the protrusions 24 do not face the restraint parts 41a of the accommodating part 41 in the thickness direction DR3. The restraint member 20 thus becomes turnable about the protrusions 26 in the sliding recesses 41d as illustrated in FIG. 12. That is, in the state in which the rear cover 5 is not attached to the rear-side case 4, the restraint member 20 in the non-restraint position is turnable about the protrusions 26.

As illustrated in FIG. 12, the restraint member 20 in the non-restraint position is turnable around a turning shaft 26a which is parallel to the widthwise direction DR2 and passes through the protrusions 26 of the attachment parts 22. The restraint member 20 in the non-restraint position is turnable in a direction DR30 in which the facing part 21 goes away from the lower end portion 14 of the first main surface 11 of the battery 10, and in a direction DR31 in which the facing part 21 gets close to the lower end portion 14.

As described above, in the state in which the rear cover 5 is not attached to the rear-side case 4, the restraint member 20 in the non-restraint position is turnable in the direction DR30 in which the facing part 21 goes away from the lower end portion 14 of the battery 10. Therefore, the restraint member 20 does not restrain the lower end portion 14 of the first main surface 11 of the battery 10 from moving outward.

In accommodating the battery 10 in the accommodating part 41, the user causes the restraint member 20 to turn so that the facing part 21 goes away from the battery 10, as illustrated in FIG. 12. Then, the battery 10 is accommodated in the accommodating part 41, and thereafter, the user causes the restraint member 20 to turn so that the facing part 21 faces the battery 10, as illustrated in FIGS. 8 and 10.

When the user causes the restraint member 20 in the non-restraint position to slide toward the upper end of the accommodating part 41 in the lengthwise direction DR1, the protrusions 25 of the attachment parts 22 of the restraint member 20 climb over the protrusions 41c of the accommodating part 41 which face the protrusions 25, to be disposed in a position closer to an upper end of the accommodating part 41, than the protrusions 41e, and the protrusions 24 of the attachment parts 22 are disposed inside the second portions 41b b of the first recesses 41b of the accommodating part 41. The restraint member 20 is thus shifted to the restraint position. As illustrated in FIGS. 9 and 11, when the restraint member 20 is in the restraint position, the protrusions 24 of the attachment parts 22 are disposed below the restraint parts 41a of the accommodating part 41, and face the restraint parts 41a in the thickness direction DR3. The restraint member 20 is thus restrained from turning in the direction DR30 in which the facing part 21 goes away from the lower end portion 14 of the first main surface 11 of the battery 10. Accordingly, the restraint member 20 restrains the lower end portion 14 of the first main surface 11 of the battery 10 from moving outward. The rear cover 5 is attached to the rear-side case 4 when the restraint member 20 is in the restraint position.

As described above, when the user causes the restraint member 20 in the non-restraint position to slide toward the upper end of the accommodating part 41 in the lengthwise direction DR1, the protrusions 25 of the attachment parts 22 climb over the protrusions 41c of the accommodating part 41 which face the protrusions 25, to be disposed in a position closer to the upper end of the accommodating part 41 than the protrusions 41c. As the result, in a user's operation to cause the restraint member 20 to slide from the non-restraint position to the restraint position, a resisting force generates to check such sliding. Thus, the user can sense the resisting force in causing the restraint member 20 to slide from the non-restraint position to the restraint position with his/her fingers, thereby easily confirming whether the restraint member 20 slides from the non-restraint position to the restraint position. Likewise, when the user causes the restraint member 20 in the restraint position to slide toward the lower end of the accommodating part 41 in the lengthwise direction DR1, the protrusions 25 climb over the protrusions 41c which face the protrusions 25, to be disposed in a position closer to the lower end of the accommodating part 41 than the protrusions 41c. As the result, the user can sense a resisting force in causing the restraint member 20 to slide from the restraint position to the non-restraint position with his/her fingers or the like, thereby easily confirming whether the restraint member 20 slides from the restraint position to the non-restraint position.

Further, when the restraint member 20 is in the restraint position, the protrusions 25 are disposed in a position closer to the upper end of the accommodating part 41 than the protrusions 41c of the accommodating part 41, so that the restraint member 20 in the restraint position is less prone to being moved toward the lower end of the accommodating part 41. In other words, the restraint member 20 in the restraint position is less prone to being moved to the non-restraint position. This makes it easier for the user to attach the rear cover 5 to the rear-side case 4 with the restraint member 20 being in the restraint position. As a result, workability is improved.

As described above, since the restraint member 20 is slidable between the restraint position and the non-restraint position in the lengthwise direction DR1, it is possible to easily restrain the lower end portion 14 of the battery 10 from moving toward the rear cover 5 by causing the restraint member 20 to slide to the restraint position.

Also, in the state in which the rear cover 5 is not attached to the electronic apparatus 1, the restraint member 20 in the non-restraint position is tunable in the direction DR30 in which the facing part 21 facing the lower end portion 14 of the first main surface 11 of the battery 10 goes away from the lower end portion 14, which facilitates the detachment of the battery 10 from the accommodating part 41.

Figure 13:
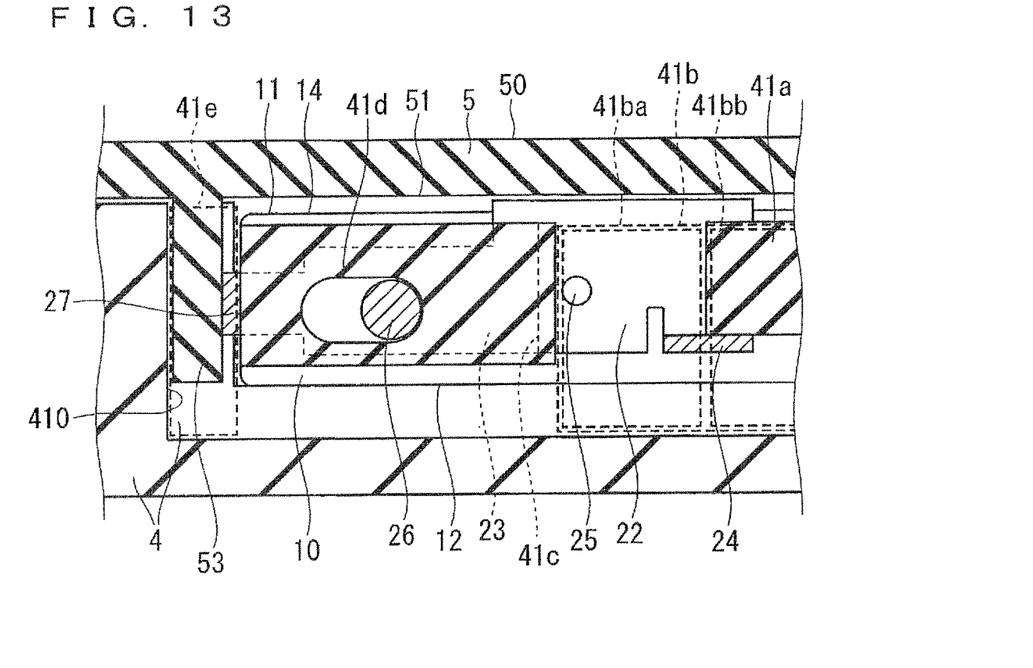
FIG. 13 illustrates an enlarged sectional view of a restraint member in a restraint position.

FIG. 13 illustrates the rear cover 5 attached to the rear-side case 4 illustrated in FIG. 11. As illustrated in FIG. 13, the rear cover 5 is attached with the restraint member 20 being in the restraint position. The two restraint parts 53 of the rear cover 5 are inserted into the respective two second recesses 41e formed in the inner wall 410 of the accommodating part 41. The restraint parts 53 inserted into the second recesses 41e face the protrusions 27 of the restraint member 20 within the second recesses 41e. That is, the restraint parts 53 become facing parts facing the protrusions 27. The restraint parts 53 face the protrusions 27 in a direction in which the restraint member 20 slides from the restraint position to the non-restraint position. As the result, it is possible to prevent the restraint member 20 from sliding from the restraint position to the non-restraint position. Therefore, it is possible to further prevent the battery 10 from coming off the accommodating part 41.

Further, when the restraint member 20 is in the non-restraint position, the protrusions 27 of the restraint member 20 are present in spaces within the second recesses 41e, where the restraint parts 53 are inserted when the restraint member 20 is in the restraint position. Accordingly, in the state that the restraint member 20 is in the non-restraint position, the restraint parts 53 of the rear cover 5 interfere with the protrusions 27 in the accommodating part 41 when the rear cover 5 is intended to be attached to the rear-side case 4. Thus, when the restraint member 20 is in the non-restraint position, it is possible to prevent the rear cover 5 from being attached to the rear-side case 4.

Modifications

Figure 14:
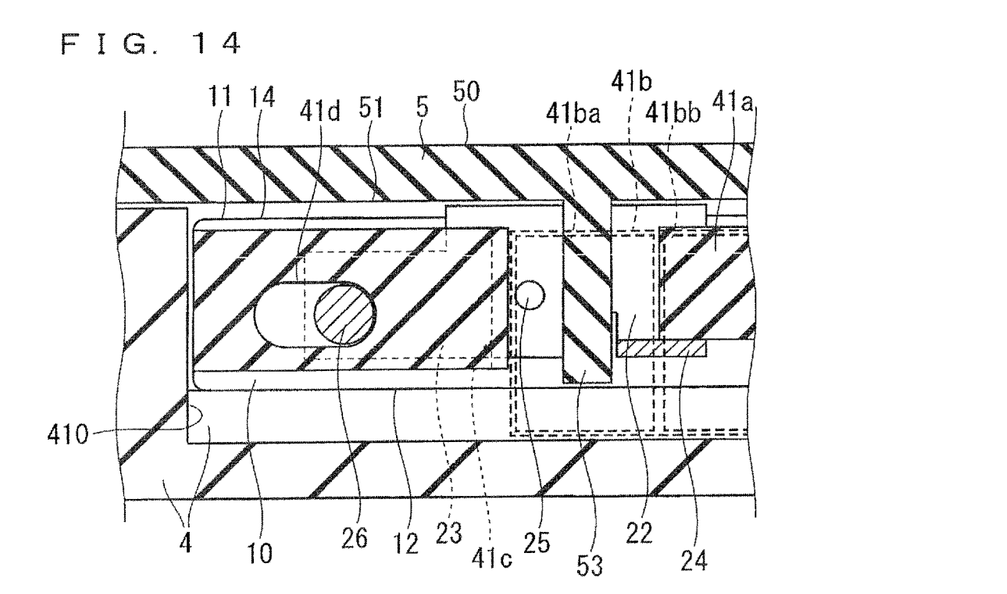
FIG. 14 illustrates an enlarged sectional view of a restraint member in a restraint position.

FIG. 14 illustrates an enlarged sectional view of the restraint member 20 in the restraint position according to one modification. As illustrated in FIG. 14, the two restraint parts 53 of the rear cover 5 are inserted into the respective first portions 41b a of the two first recesses 41b formed in the inner wall 410 of the accommodating part 41. The restraint parts 53 inserted into the first portions 41b a face the protrusions 24 of the restraint member 20 inside the first recesses 41b. The restraint parts 53 face the protrusions 24 in a direction in which the restraint member 20 slides from the restraint position to the non-restraint position. As the result, in a manner similar to that in the structure illustrated in FIG. 13, it is possible to prevent the restraint member 20 from sliding from the restraint position to the non-restraint position. Therefore, it is possible to further prevent the battery 10 from coming off the accommodating part 41.

Further, by utilizing the protrusions 24 for restraining the restraint member 20 from turning in the direction DR30, it is possible to restrain the restraint member 20 from moving from the restraint position to the non-restraint position, so that the structure of the electronic apparatus 1 can be simplified. For example, as illustrated in FIG. 14, the protrusions 27 provided in the structure in FIG. 13 become unnecessary.

Alternatively, the restraint parts 53 may be designed so as to interfere with the protrusions 24 inside the first portions 41b a of the first recesses 41b when the rear cover 5 is intended to be attached to the rear-side case 4 in the state in which the restraint member 20 is in the non-restraint position. As the result, it is possible to prevent the rear cover 5 from being attached to the rear-side case 4 in the state in which the restraint member 20 is in the non-restraint position.

The restraint member 20 is slidable in the lengthwise direction DR1 in the above description. Alternatively, the restraint member 20 may be slidable in any other direction that is parallel to the first main surface. For example, the restraint member 20 may be slidable in the widthwise direction DR2.

Also in the above description, the present disclosure is applied to a portable phone as an exemplary embodiment; however, the present disclosure is also applicable to any electronic apparatus that includes a battery. For example, the present disclosure is also applicable to, for example, a tablet terminal, and a wearable electronic apparatus to be put on an arm or the like.

In the above description, the electronic apparatus 1 is described in detail, but the above description is the exemplification in all aspects and embodiments of the present disclosure are not intended to be limited thereto. In addition, various modifications described above are applicable in combination as long as they are not mutually inconsistent. And, it is construed that numerous modifications which are not exemplified can be envisaged without departing from the scope of the present disclosure.

The invention claimed is:

1. An electronic apparatus from which a battery is detachable,
the electronic apparatus comprising:
a battery including a first surface including a first end portion and a second end portion in a direction parallel to the first surface, and a second surface opposite to the first surface;
a battery accommodating part configured to accommodate the battery with the first surface exposed from the battery accommodating part;
a cover configured to cover the battery in the battery accommodating part;
a first restraint part configured to restrain the first end portion from moving toward the cover when covered with the cover; and
a second restraint part configured to restrain the second end portion from moving toward the cover when covered with the cover, wherein the second restraint part is slidable toward and away from the first restraint part so as to be placed in a restraint position and a non-restraint position, respectively.

2. The electronic apparatus according to claim 1, wherein
the second restraint part includes a first facing part facing the second end portion at the restraint position, and
in a state in which the cover is not attached to the electronic apparatus,
the second restraint part in the non-restraint position is turnable in a first direction in which the first facing part goes away from the second end portion and in a second direction in which the first facing part gets close to the second end portion, and the second restraint part in the restraint position is restrained from turning in the first direction.

3. The electronic apparatus according to claim 2, wherein
the battery accommodating part comprises an inner wall including a recess,
the second restraint part includes a first protrusion fitted into the recess and movable within the recess in the first surface, and
the second restraint part in the non-restraint position is turnable about the first protrusion.

4. The electronic apparatus according to claim 2, wherein
the battery accommodating part comprises an inner wall including a second protrusion,
the second restraint part includes a third protrusion,
when the second restraint part is in the restraint position, the second protrusion and the third protrusion face each other, so that the second restraint part is restrained from turning in the first direction, and
when the second restraint part is in the non-restraint position, the second protrusion and the third protrusion do not face each other, so that the second restraint part is turnable in the first direction.

5. The electronic apparatus according to claim 4, wherein
the cover includes a second facing part facing the third protrusion of the second restraint part in the restraint position in a direction in which the second restraint part slides from the restraint position to the non-restraint position when the cover is attached to the electronic apparatus.

6. The electronic apparatus according to claim 1, wherein
the cover includes a third restraint part configured to restrain the second restraint part from moving from the restraint position to the non-restraint position when the cover is attached to the electronic apparatus.

7. An electronic apparatus from which a battery is detachable, the electronic apparatus comprising:
a battery including a first surface including a first end portion and a second end portion in a direction parallel to the first surface, and a second surface opposite to the first surface;
a battery accommodating part configured to accommodate the battery with the first surface exposed from the battery accommodating part;
a cover configured to cover the battery in the battery accommodating part;
a first restraint part configured to restrain the first end portion from moving toward the cover when covered with the cover; and
a second restraint part configured to restrain the second end portion from moving toward the cover when covered with the cover, wherein
the second restraint part is slidable between a restraint position and a non-restraint position along the first surface, and includes a first facing part facing the second end portion at the restraint position, and
in a state in which the cover is not attached to the electronic apparatus,
the second restraint part in the non-restraint position is turnable in a first direction in which the first facing part goes away from the second end portion and in a second direction in which the first facing part gets close to the second end portion, and the second restraint part in the restraint position is restrained from turning in the first direction, and
wherein the battery accommodating part comprises an inner wall including a recess, the second restraint part includes a first protrusion fitted into the recess and movable within the recess in the first surface, and the second restraint part in the non-restraint position is turnable about the first protrusion.

8. An electronic apparatus from which a battery is detachable, the electronic apparatus comprising:
a battery including a first surface including a first end portion and a second end portion in a direction parallel to the first surface, and a second surface opposite to the first surface;
a battery accommodating part configured to accommodate the battery with the first surface exposed from the battery accommodating part;
a cover configured to cover the battery in the battery accommodating part;
a first restraint part configured to restrain the first end portion from moving toward the cover when covered with the cover; and
a second restraint part configured to restrain the second end portion from moving toward the cover when covered with the cover, wherein
the second restraint part is slidable between a restraint position and a non-restraint position along the first surface, and includes a first facing part facing the second end portion at the restraint position, and
in a state in which the cover is not attached to the electronic apparatus,
the second restraint part in the non-restraint position is turnable in a first direction in which the first facing part goes away from the second end portion and in a second direction in which the first facing part gets close to the second end portion, and the second restraint part in the restraint position is restrained from turning in the first direction, and
wherein the battery accommodating part comprises an inner wall including a second protrusion, the second restraint part includes a third protrusion, and
when the second restraint part is in the restraint position, the second protrusion and the third protrusion face each other, so that the second restraint part is restrained from turning in the first direction, and
when the second restraint part is in the non-restraint position, the second protrusion and the third protrusion do not face each other, so that the second restraint part is turnable in the first direction.

* * * * *